United States Patent Office 3,649,670
Patented Mar. 14, 1972

3,649,670
TRIALKYLHYDRAZINOMETHYLPHENYL N-ALKYL CARBAMATES
Henri Sidi, Paramus, N.J., assignor to Tenneco Chemicals, Inc.
No Drawing. Filed Oct. 16, 1967, Ser. No. 675,362
Int. Cl. C07c *125/06*
U.S. Cl. 260—479 C    7 Claims

ABSTRACT OF THE DISCLOSURE

Trialkylhydrazinomethylphenyl N - alkyl carbamates are useful as insecticides. Among the most active of these compounds as insecticides are trimethylhydrazinomethyl-3,5 - dimethylphenyl N-methyl carbamate, trimethylhydrazinomethyl - 2 - methoxyphenyl N-methyl carbamate, and trimethylhydrazinomethyl - 4 - methylthio-m-cresyl N-methyl carbamate.

---

This invention relates to insecticidal compositions and to their use in the control of insects. More particularly, it relates to the control of insects using insecticidal compositions that contain trialkylhydrazinomethylphenyl N-alkyl carbamates as their insecticidally-active ingredients.

In accordance with this invention, it has been discovered that certain trialkylhydrazinomethylphenyl N-alkyl carbamates are effective insecticides. These compounds have the structural formula

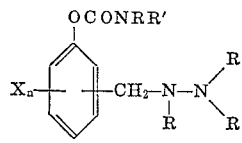

wherein each X represents chlorine, a nitro group, an alkyl group having 1 to 4 carbon atoms, an alkoxy group having 1 to 4 carbon atoms, or an alkylthio group having 1 to 4 carbon atoms; each R represents an alkyl group having 1 to 4 carbon atoms; R' represents hydrogen or an alkyl group having 1 to 4 carbon atoms; and $n$ represents an integer in the range of zero to three. The preferred compounds for use in insecticidal compositions are those in which each R is methyl and R' is hydrogen. Illustrative of these compounds are the following: trimethylhydrazinomethyl - 4 - (methylthio)- phenyl N-methyl carbamate, trimethylhydrazinomethyl - 2 - methylphenyl N - methyl carbamate, trimethylhydrazinomethyl - 4 - methoxyphenyl N-methyl carbamate, trimethylhydrazinomethyl - 2 - chlorophenyl N-methyl carbamate, and the like. A single trialkylhydrazinomethylphenyl N-alkyl carbamate or a mixture of two or more of these compounds may be present in the insecticidal compositions of this invention.

The trialkylhydrazinomethylphenyl N - alkyl carbamates may be prepared by any suitable and convenient procedure. For example they may be prepared by reactign the appropriate trialkylhydrazinomethylphenol with an alkyl isocyanate in a solvent, such as tetrahydrofuran, at a temperature not exceeding about 40° C.

The trialkylhydrazinomethylphenols that can be used in the preparation of the carbamates have the structural formula

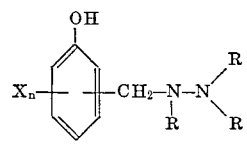

wherein X, R and $n$ have the aforementioned significance.

These phenols can be prepared by the reaction of phenol or a substituted phenol with a trialkylhydrazine and formaldehyde, as is described in my copending patent application Ser. No. 675,334, which was filed on Oct. 16, 1967, which is now U.S. 3,543,265.

The alkyl isocyanates that can be reacted with the trialkylhydrazinomethylphenols to form the carbamates have the structure R—CNO, wherein R represents an alkyl group having 1 to 4 carbon atoms. Particularly satisfactory results have been obtained using methyl isocyanate.

While the carbamates may be used as such in the control of insects, they are usually and preferably used in combination with an inert carrier that facilitates the dispensing of dosage quantities of the insecticidal composition and assists in its absorption by the insects. The carbamates may be mixed with or deposited upon inert particulate solids, such as fullers earth, talc, diatomaceous earth, hydrated calcium silicate, kaolin, and the like, to form dry particulate compositions. Such compositions may, if desired, be dispersed in water with or without the aid of a surface-active agent. The insecticidal compounds are preferably dispensed in the form of solutions or dispersions in inert organic solvents or water or as oil-in-water emulsions. The concentration of the insecticide in the composition may be varied within wide limits and depends upon a number of factors, the most important of which are the insects being treated and the rate at which the composition is to be applied. In most cases the composition contains about 0.1 percent to 85 percent by weight of one or more of the aforementioned trialkylhydrazinomethylphenyl N-alkyl carbamates. If desired, the compositions may contain other insecticides, such as chlordane, benzene hexachloride, and DDT; fungicides, such as sulfur and the metal dimethyl dithiocarbamates; or plant nutrients, such as urea, ammonium nitrate, and potash.

The insecticidal compositions of this invention can be used for controlling a wide variety of insects. The terms "insects" and "insecticide" are used herein in their broad common usage and include invertebrate animals belonging to the class Insecta as well as spiders, mites, lice, nematodes, and the like.

The invention is further illustrated by the examples that follow:

EXAMPLE 1

A reaction mixture containing 30.7 grams (0.2 mole) of 4-methylthio-m-cresol and 75.3 grams (0.24 mole) of an aqueous solution containing 24.2 percent of trimethylhydrazine was stirred at 40° C. until the mixture became a clear liquid and remained liquid when it was cooled to room temperature. To this mixture was added dropwise 19.5 grams (0.24 mole) of a 37 percent aqueous formaldehyde solution while external cooling was used to maintain the temperature of the reaction mixture at 25°–30° C. When all of the formaldehyde had been added, the reaction mixture was stirred at 25°–30° C. for 6 hours. The organic phase that separated from the reaction mixture was extracted with diethyl ether. The ether extract was dried over sodium sulfate, filtered, and then heated under vacuum to remove the ether. The product, trimethylhydrazinomethyl - 4 - methylthio-m-cresol, a yellow oil, was obtained in a 78 percent yield.

To a mixture of 46.8 grams (0.195 mole) of trimethylhydrazinomethyl - 4 - methylthio-m-cresol and 100 ml. of anhydrous tetrahydrofuran was added 11.6 grams (0.203 mole) of methyl isocyanate. During the addition the temperature of the mixture was not allowed to exceed 40° C. The reaction mixture was stirred at room temperature for 6 hours and then heated under vacuum to remove the solvent. The product, trimethylhydrazinomethyl - 4-methylthio-m-cresyl N-methyl carbamate, was a viscous liquid that was obtained in a 93.1 percent yield. It contained 14.58% N, 57.42% C, and 7.68% H (calculated for $C_{14}H_{23}O_2S$, 14.15% N, 56.6% C, and 7.73% H). The structure of the compound was confirmed by infrared analysis.

EXAMPLES 2–13

A series of trimethylhydrazinomethylphenyl N-methyl carbamates was prepared by the procedure described in Example 1. The compounds prepared and their analyses are given in Table I.

Each of the other carbamates of this invention can also be used as the active component of insecticidal compositions.

The terms and expressions which have been employed are used as terms of description and not of limitation. There is no intention in the use of such terms and expressions of excluding any equivalents of the features shown and described or portions thereof; it is recognized, however, that various modifications are possible within the scope of the invention claimed.

What is claimed is:

1. A compound having the structural formula

TABLE I

| Ex. No. | Compound | Analysis, percent | | | | | |
|---|---|---|---|---|---|---|---|
| | | Found | | | Calculated | | |
| | | N | C | H | N | C | H |
| 2 | Trimethylhydrazinomethyl-2-methylphenyl N-methyl carbamate | 14.90 | 63.01 | 8.15 | 16.7 | 62.1 | 8.35 |
| 3 | Trimethylhydrazinomethyl-3-methylphenyl N-methyl carbamate | 15.9 | 62.20 | 8.42 | 16.7 | 62.1 | 8.35 |
| 4 | Trimethylhydrazinomethyl-4-methylphenyl N-methyl carbamate | 14.78 | 64.16 | 8.63 | 16.7 | 62.1 | 8.35 |
| 5 | Trimethylhydrazinomethyl-3,5-dimethylphenyl N-methyl carbamate | 13.81 | 62.83 | 8.31 | 15.75 | 63.3 | 8.68 |
| 6 | Trimethylhydrazinomethyl-2-methoxyphenyl N-methyl carbamate | 15.53 | 59.75 | 6.78 | 15.65 | 58.3 | 7.87 |
| 7 | Trimethylhydrazinomethyl-4-methoxyphenyl N-methyl carbamate | 13.86 | 60.41 | 7.65 | 15.65 | 58.3 | 7.87 |
| 8 | Trimethylhydrazinomethyl-2-chlorophenyl-N-methyl carbamate | 13.28 | 50.28 | 6.11 | 15.45 | 53.10 | 6.63 |
| 9 | Trimethylhydrazinomethyl-4-chlorophenyl N-methyl carbamate | 13.64 | 56.64 | 6.40 | 15.45 | 53.10 | 6.63 |
| 10 | Trimethylhydrazinomethyl-2-nitrophenyl N-methyl carbamate | 17.25 | 51.90 | 5.00 | 19.85 | 51.10 | 6.38 |
| 11 | Trimethylhydrazinomethyl-4-nitrophenyl N-methyl carbamate | 17.85 | 50.65 | 5.73 | 19.85 | 51.10 | 6.38 |
| 12 | Trimethylhydrazinomethyl-4-(methylthio)-phenyl N-methyl carbamate | 13.05 | 53.21 | 6.59 | 14.85 | 55.10 | 7.42 |
| 13 | Trimethylhydrazinomethylphenyl N-methyl carbamate | 17.05 | 60.4 | 8.08 | 17.7 | 60.9 | 8.02 |

EXAMPLE 14

Acetone solutions were prepared by dissolving 100 mg. portions of the products of Examples 1–13 in 10 ml. of acetone that contained 2000 p.p.m. of sorbitan trioleate and 5000 p.p.m. of a polyoxyethylene ether of sorbitan monooleate. The acetone solutions were dispersed in 90 ml. portions of distilled water to form aqueous solutions that contained 1000 p.p.m. of the carbamate. More dilute solutions were prepared by adding distilled water to these solutions.

EXAMPLE 15

A series of experiments was carried out in which the compositions of Example 14 were applied to plants infested with Mexican bean beetles, Southern armyworms, aphids, houseflies, or 2-spotted spider mites. The degrees of control of the insect and of injury to the plants are given in Table II.

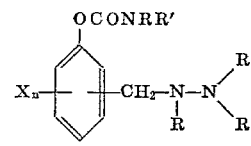

wherein each X represents a member selected from the group consisting of chlorine, nitro, alkyl groups having 1 to 4 carbon atoms, alkoxy groups having 1 to 4 carbon atoms, and alkylthio groups having 1 to 4 carbon atoms; each R represents an alkyl group having 1 to 4 carbon atoms; R' represents a member selected from the group consisting of hydrogen and alkyl groups having 1 to 4 carbon atoms; and $n$ represents an integer in the range of zero to three.

2. A compound as set forth in claim 1 wherein each R represents methyl and R' represents hydrogen.

TABLE II

| Insecticide | Rate of application (p.p.m.) | Mexican bean beetle | | Southern armyworm | | Aphid, percent control | 2-spotted spider mites, percent control | Houseflies, percent control |
|---|---|---|---|---|---|---|---|---|
| | | Percent control | Injury to foliage | Percent control | Injury to foliage | | | |
| Product of Example: | | | | | | | | |
| 1 | 1,000 | 100 | Very slight | 100 | None | 100 | 100 | 100 |
| | 250 | 80 | None | 0 | | 90 | 37 | 100 |
| | 50 | 80 | do | 0 | | 0 | 0 | 30 |
| | 25 | 80 | do | | | | | |
| 2 | 1,000 | 100 | None | 0 | | 0 | 0 | 0 |
| 3 | 1,000 | 100 | Very slight | 0 | | 50 | 0 | 50 |
| 4 | 1,000 | 100 | do | 0 | | 50 | 0 | 80 |
| 5 | 1,000 | 20 | Very slight | 0 | | 100 | 0 | 70 |
| | 250 | | | | | 12 | | 25 |
| 6 | 1,000 | 40 | Very slight | 0 | | 100 | 0 | 80 |
| | 250 | 40 | do | | | 65 | | 50 |
| 7 | 1,000 | 60 | Very slight | 0 | | 90 | 0 | 10 |
| 8 | 1,000 | 0 | | 0 | | 0 | 0 | 90 |
| | 250 | | | | | | | 90 |
| 10 | 1,000 | 20 | Moderate | 20 | Moderate | 0 | 0 | 10 |

3. A compound as set forth in claim 2 wherein X represents methyl and $n$ is one.

4. A compound as set forth in claim 2 wherein X represents chlorine and $n$ is one.

5. A compound as set forth in claim 2 wherein X represents methoxy and $n$ is one.

6. The compound as set forth in claim 2 that has the structural formula

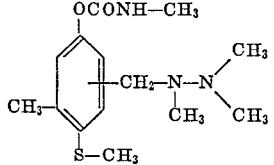

7. A compound as set forth in claim 2 that has the structural formula

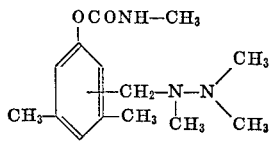

No references cited.

JAMES A. PATTEN, Primary Examiner

U.S. Cl. X.R.

424—300